United States Patent
Sagi et al.

(10) Patent No.: US 9,081,952 B2
(45) Date of Patent: Jul. 14, 2015

(54) SYSTEMS AND METHODS FOR PROVIDING SECURE ELECTRONIC DOCUMENT STORAGE, RETRIEVAL AND USE WITH ELECTRONIC USER IDENTITY VERIFICATION

(75) Inventors: Surya R. Sagi, Southbury, CT (US);
Kevin Jonsson, Bedford, NY (US);
Bernard E. Gracy, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 846 days.

(21) Appl. No.: 13/341,963

(22) Filed: Dec. 31, 2011

(65) Prior Publication Data

US 2012/0180116 A1 Jul. 12, 2012

Related U.S. Application Data

(60) Provisional application No. 61/430,525, filed on Jan. 6, 2011.

(51) Int. Cl.
*G06F 21/31* (2013.01)
*G06F 21/45* (2013.01)

(52) U.S. Cl.
CPC ...................................... *G06F 21/45* (2013.01)

(58) Field of Classification Search
CPC ....................................................... G06F 21/31
USPC ............................................................ 726/7
See application file for complete search history.

(56) References Cited

U.S. PATENT DOCUMENTS

| | | | |
|---|---|---|---|
| 7,117,528 B1 * | 10/2006 | Hyman et al. | 726/5 |
| 7,502,761 B2 | 3/2009 | Siegal et al. | |
| 7,640,322 B2 | 12/2009 | Wendkos et al. | |
| 7,779,457 B2 * | 8/2010 | Taylor | 726/7 |
| 8,005,732 B2 * | 8/2011 | Khandros et al. | 705/35 |
| 2006/0253597 A1 | 11/2006 | Mujica | |
| 2006/0271457 A1 * | 11/2006 | Romain et al. | 705/35 |
| 2006/0282270 A1 * | 12/2006 | Sheets et al. | 705/1 |
| 2008/0127296 A1 * | 5/2008 | Carroll et al. | 726/1 |
| 2008/0288299 A1 * | 11/2008 | Schultz | 705/4 |
| 2009/0030884 A1 | 1/2009 | Pulfer et al. | |
| 2009/0138730 A1 * | 5/2009 | Cook et al. | 713/193 |
| 2009/0157523 A1 * | 6/2009 | Jones et al. | 705/26 |
| 2010/0131409 A1 * | 5/2010 | Lawyer et al. | 705/44 |

OTHER PUBLICATIONS

PCT/US2012/020412 International Search Report.
PCT/US2012/020412 Written Opinion.
PCT/US2012/020426 International Search Report.
PCT/US2012/020426 Written Opinion.

* cited by examiner

*Primary Examiner* — Kambiz Zand
*Assistant Examiner* — Thanh Le
(74) *Attorney, Agent, or Firm* — Brian A. Lemm; Charles R. Malandra, Jr.; Steven J. Shapiro

(57) ABSTRACT

Systems and methods for efficient and timely electronic new user authentication in a digital mailbox system using a sliding scale approach to include one or more identity authentication systems as appropriate for system security needs are provided. The system first obtains new user name and address data. Because the address is an important data point, the system first verifies the address before expending the resources of an identity data search. If the address is valid, the system calls an identity verification system and provides an identity quiz to the user based upon additional identity verification data. If the user passes the quiz, then a new account is setup and any other systems users having an account at that address are notified.

18 Claims, 7 Drawing Sheets

SYSTEMS AND METHODS FOR PROVIDING SECURE ELECTRONIC DOCUMENT STORAGE, RETRIEVAL AND USE WITH ELECTRONIC USER IDENTITY VERIFICATION

CROSS REFERENCE TO RELATED APPLICATIONS

This application claims priority under 35 U.S.C. section 119(e) from Provisional Patent Application Ser. No. 61/430,525, filed Jan. 6, 2011, entitled Systems and Methods for Providing Secure Electronic Document Storage, Retrieval and Use with Electronic User Identity Verification, by Surya R. Sagi, et al., which is incorporated herein by reference in its entirety.

TECHNICAL FIELD

The illustrative embodiments of the present application relate generally to user authentication in document delivery systems and, more particularly, to new and useful systems and methods for efficient and timely authentication using a sliding scale approach to include one or more identity authentication systems as appropriate for system security needs.

BACKGROUND

In the United States, many people are utilizing electronic access to financial and other transactional accounts. Additionally, there has been significant adoption of electronic bill payment in recent years, with electronic payment now outpacing payment by putting a check in the mail. However, many people prefer to continue to receive physical delivery of paper statements.

Systems and methods have been described for using a physical mailing address as an electronic mail address. For example, U.S. Pat. No. 7,478,140, entitled System and Method for Sending Electronic Mail and Parcel Delivery Notification Using Recipient's Identification Information, issued Jan. 13, 2009 to King, et al. describes a system using a recipient's physical address.

Digital mail systems exist today that process only digital mail messages that are delivered to digital mail recipients. In certain digital mail systems, user authentication includes communications through a physical channel. However, such systems do not provide efficient and timely user authentication using electronic channels.

Accordingly, there is a need, among other needs, for systems and methods to provide efficient and timely user authentication using electronic channels. Moreover, there is a need to provide address authentication before allocating resources to identity verification and to notify additional users at an address when a new account is opened.

BRIEF DESCRIPTION OF THE DRAWINGS

The accompanying drawings show illustrative embodiments of the invention and, together with the general description given above and the detailed description given below serve to explain certain principles of the invention. As shown throughout the drawings, like reference numerals designate like or corresponding parts.

FIG. 5 is a diagram showing a screen display of a new user data entry screen according to an illustrative embodiment of the present application.

FIG. 6 is a diagram showing a screen display of a user authentication quiz according to an illustrative embodiment of the present application.

SUMMARY

Figure 1:
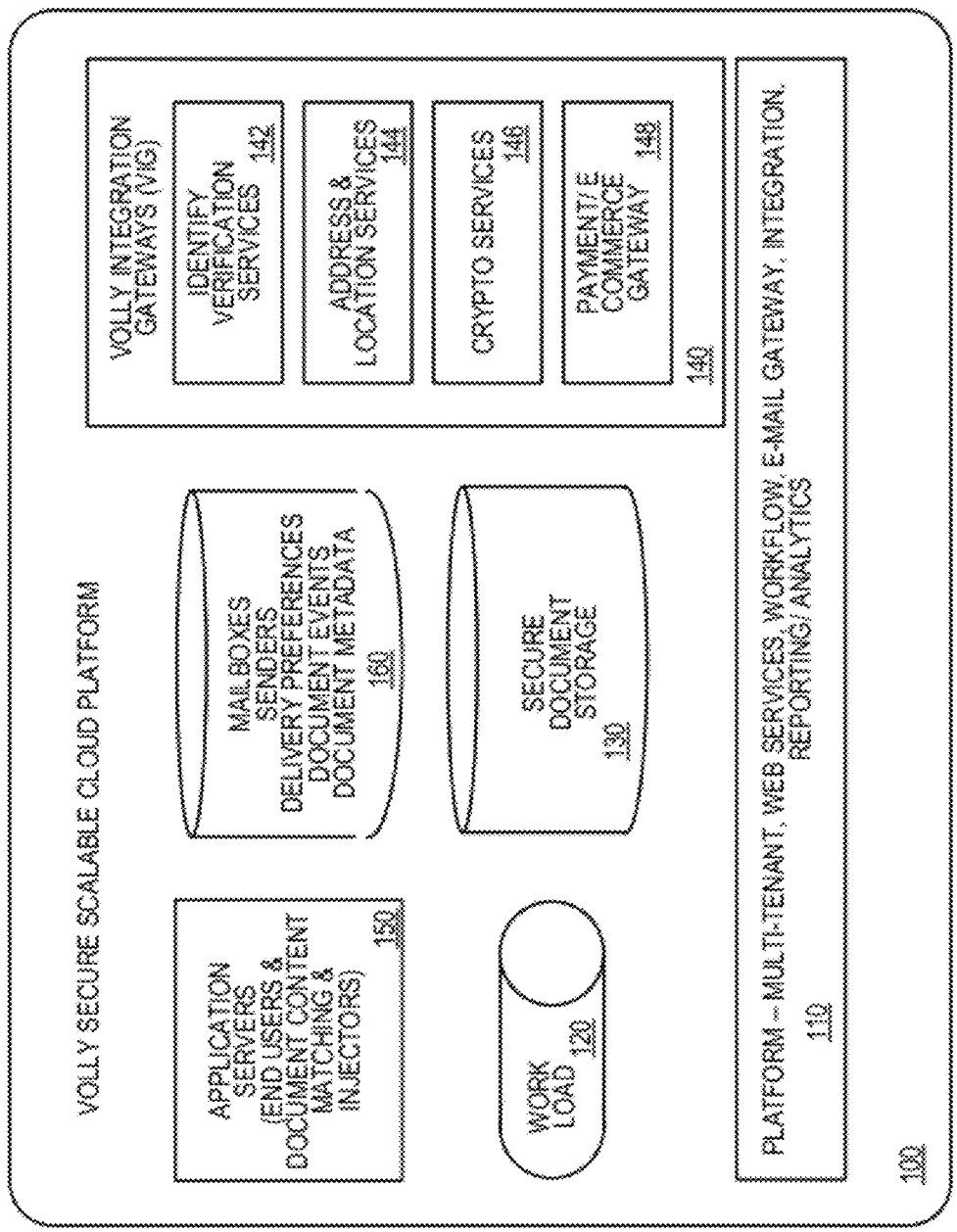
FIG. 1 is a schematic diagram showing a system for providing integrated mail management having efficient and timely user authentication according to an illustrative embodiment of the present application.

Illustrative systems and methods for efficient and timely electronic new user authentication in a digital mailbox system using a sliding scale approach to include one or more identity authentication systems as appropriate for system security needs are provided. In one illustrative embodiment, the system first obtains a new user name and a current address and additional identity data from the user electronically using the communications network. It then determines if the current address is a valid address utilizing an address validation system. If the current address is determined to be invalid, then the system performs an error routine and halts. If the current address is determined to be valid, then the system determines if the name and current address are associated with an existing account on the digital mailbox system. Then, if the name and current address are associated with an existing account, the system then performs an existing account routine and halts. If the name and current address are not associated with an existing account, then the system electronically sends the name and current address to an identity verification system and electronically receives identity verification data.

In additional alternative embodiments, the system determines an identity confidence value based upon the received identity verification data. If the identity confidence value indicates a partial match or a full match, then the system electronically presents an identity quiz to the user having a passing score requiring a first score if the partial match is indicated and a second score that is lower than the first score, if the full match is indicated. If the passing score is indicated, the system sends a PIN to the user through a second electronic communications channel. If the PIN is received from the user, then the system creates a digital mailbox account for the user. The system also determines if a second user has a digital mailbox associated with the current address. If the second user has a digital mailbox associated with the current address, then the system notifies the second user that another digital mailbox has been created that is associated with the current address.

In yet additional alternative embodiments, a computer program system being executed on a data processing and storage system for processing digitized items from a mailer associated with a digital mailbox that is configured to digitally process a new user subscription request to provide real-time subscription access includes the data processing system executing instructions including, electronically obtaining new user information, electronically attempting to authenticate the new user information using a first external provider, if the new user is authenticated using the first external provider, then allowing the new user to subscribe, if the new user is not authenticated using the first external provider, then using a second external provider and a user quiz to attempt to authenticate the new user information using the second external provider, if the new user is authenticated using the second external provider and quiz, then allowing the new user to subscribe, and if the new user is not authenticated using the second external provider, then providing an error message and instructions for further action to the user.

Several additional alternatives are disclosed and described herein.

DETAILED DESCRIPTION

The present invention is described in the context of illustrative embodiments directed to new and useful systems and methods for allowing mail recipients to electronically manage mail. Digital mail systems exist today that process only digital mail messages that are delivered to digital mail recipients. In certain digital mail systems, user authentication includes communications through a physical channel. However, such systems do not provide efficient and timely user authentication using electronic channels.

Accordingly, the illustrative embodiments described herein satisfy many needs including satisfying the need for systems and methods to provide efficient and timely user authentication using electronic channels. Additionally, certain illustrative embodiments described herein provide address authentication before allocating resources to identity verification. Still further additional embodiments provide notification to additional users at an address when a new account is opened.

Several illustrative embodiments described herein refer interchangeably to the VOLLY secure digital delivery service, digital mailbox system (DMB) or Digital Mail Platform (DMP). The illustrative system provides a closed, secure, end-to-end system that consolidates and digitally delivers items, also called mail pieces, such as mail, transaction statements, marketing promotions, catalogs and other rich media from businesses to consumers. This delivery may be based upon the recipient's (user, consumer) physical street address. The illustrative embodiments provide a novel consumer experience, allowing customers to help manage their lifestyles with greater convenience and control. This new communications channel provides benefits to mailers including by providing a low-cost yet trusted and secure electronic distribution platform, with minimal expense in switching from existing mailing processes including physical mailing processes. Moreover, mailers (senders, billers, etc.) are provided the opportunity to provide electronic metadata such rich time-sensitive data to the recipients, even if the mail pieces are delivered physically.

Consumers are provided several benefits including the ability to aggregate mail digitally from multiple providers, to enjoy secure remote access from a single log-in, and to choose from a wealth of options for sorting, prioritizing, processing, paying, archiving, retrieving, discarding and reporting on all their mail-based activities across numerous electronic client platforms including smart phones, tablets, laptop computers, desktop computers and other network capable computing devices. Moreover, the consumers are provided enhanced management and scheduling tools to aggregate time-sensitive data for mail pieces received electronically, by physical mail and/or by user uploading of documents into the system such as for secure storage and record keeping. Additionally, it may offer consumers opt-in control over how they will be marketed and communicated to, and in what format. Here, an illustrative calendar based system for organizing reminders and notices as well as facilitating follow-on actions related to digital documents including mail, transaction statements, marketing promotions, catalogs and rich media is described. Mail pieces herein can refer to letters, bills, statements, postcards, flyers, offers, catalogs and other types of mail that are commonly received.

Several illustrative hardware and software systems and subsystems are described herein that may be implemented using one or more alternative architectures. Here, in an alternative applicable to any of the embodiments the system is implemented on a cloud based platform using Infrastructure as Service (IaaS) architecture for processing and storage such as the RACKS PACE CLOUD, and TERREMARK ECLOUD platform or the AMAZON EC2 platform. Alternatively, the systems, processes and storage functions described may be implemented using other hosting architectures such as in-house, dedicated hosting, shared hosting or some other hosting model. As a further alternative, the MICROSOFT AZURE platform may be utilized.

Several illustrative hardware and software systems and subsystems are described herein that may advantageously utilize certain available components. For example, automated document factories having many configurations may be purchased from Pitney Bowes Inc. located in Stamford, Conn. Similarly, certain print-to-mail systems are available from the Pitney Bowes Emtex and Pitney Bowes Business Insight subsidiaries of Pitney Bowes Inc. located in Stamford, Conn. Systems herein may utilize print stream processing systems, document printing, insertion and franking systems and electronic bill presentment and payment (EBPP) systems available from Pitney Bowes Inc. The servers described are typically INTEL architecture servers such as DELL servers using the WINDOWS SERVER operating system software and the databases utilize APACHE CASSANDRA database systems. Alternatively, ORACLE database systems may be utilized. Additionally, the illustrative embodiments are described as enhancements to previously commercially available software systems marketed by EMTEX available from Pitney Bowes Inc. of Stamford, Conn.

Additionally, certain outgoing mail print stream processing systems have been described for separating documents in a print stream or batch into two separate print streams—a physical delivery print stream and an electronic delivery print stream based on customer delivery preferences. Commonly-owned U.S. Pat. No. 6,343,327, entitled System and Method for Electronic and Physical Mass Mailing, issued to Daniels, Jr., et al. on Jan. 29, 2002 describes such systems and is incorporated by reference herein in its entirety. Such systems described therein may be modified using the systems, processes and techniques described herein to provide an initial delivery channel with a backup channel that is used when deemed necessary.

User authentication processes often require communications through a physical mail channel. There are certain commercially available user identity information products available including several products from EXPERIAN of Costa Mesa, Calif. EXPERIAN TRUEVUE is a Customer Data Integration (CDI) solution that may be used to obtain user identity authentication information. It synchronizes records across multiple business units and databases to deliver a complete, consistent and accurate view of customers over time. The illustrative embodiments described herein utilize the TRUEVUE service, but other similar systems may be used interchangeably.

Several illustrative embodiments of digital mailbox system designs are described that may be implemented for use alone or in various combinations.

Referring to FIG. 1, a schematic diagram showing a system 100 for providing integrated mail storage and management according to an illustrative embodiment of the present application is disclosed. In this illustrative embodiment, the platform 110 is hosted in an economical, scalable, multi-tenant cloud facility that provides for web services, workflow development and deployment, an e-mail gateway, external system integration and reporting/analytics facilities. Such a system provides for seamless redundancy, load balancing and geographic balancing. Several application server components are deployed such as an end user interface to handle end user mail piece recipient access to the system such as through PC browser based interface through the Internet or other appropriate network. Document content injectors and content processing systems are deployed. A process server 120 is deployed for executing system functionality. As can be appreciated, the system provides for the receipt and storage of confidential personal documents. Accordingly, the system authenticates a new user before providing access to a digital mailbox in order to minimize the chance of misdirected or improperly accessed mail.

The Recipient Mailbox framework and related data such as sender and recipient preference profile storage, document event storage and document metadata storage are provided for in memory storage 160. Secure document storage 130 is provided to store the received mail piece content documents such as PDF format documents received from mailers and PDF format documents scanned and uploaded by the user. Moreover, document metadata includes metadata associated with physically mailed mail pieces that are not necessarily stored in the electronic secure document storage 130. As described herein, time-sensitive data for physically mailed documents may be stored and displayed/manipulated by the user/recipient. In such situations, a document identifier is assigned to a mail piece that is physically mailed and the identifier is used to store and retrieve metadata from data store 160 for display and manipulation in the system. If the user later elects to upload a scan of the mail piece, the system may allow the user to associate the scan with the previously input document identifier. For example, a user with system ID=99 could have a paper document ID for an uploaded document of P000000099000001 and an electronic document ID for a delivered document of E000000099000001, where the letters P and E distinguish paper from electronic and 99 is the customer number. Additionally a multiple digit document type filed can be added such as 0001 for bills resulting in P00000000990001000001 for a document identifier P(USER)(TYPE)(DOC). Alternatively UUID schemes may be used. If the user selects both (B) digital and physical delivery, the document identifier would be B00000000990001000001.

Several illustrative gateways 140 are implemented in the cloud system including an identity verification gateway 142 that is used to verify the identity of system users/mail piece recipients. Here, the gateway accesses the external EXPERIAN TRUEVUE services. Additionally, address and location services gateways 144 are provided. Here, the address services gateway may be external and may be used to verify addresses before user identity verification proceeds as described herein to conserve resources.

A payment services/ecommerce gateway is provided to process bill payment and ecommerce activity such as catalog orders and promotional offer redemption activity. Certain cryptography functions may be implemented outside of the cloud system, so a cryptography services gateway 146 is provided. The internetworking connections may be secured using standard security processes and the documents and metadata/profiles may be encrypted.

In certain embodiments, a digital mailbox will be created for every individual living at every delivery point in the targeted geography of the DMP system. In such cases, the Digital Mail Platform provides an alternative delivery channel for items including mail, transaction statements, direct mail and catalogues by consolidating mail for consumers based on street address of the recipients. In such an illustrative embodiment, the Digital Mail Platform has at least 3 major systems and several subsystems interfacing to other products/systems for value added services. In a consumer mashup system, each consumer associate with street address and receive communications aggregated at address based digital mailboxes. The core platform system establishes digital mailboxes and associate the content received from mailers & publishers to consumers and provide additional value added services. The Secure Mailer Gateway creates content for digital mailboxes with required metadata and security. System will split and send e-Delivery of mail that has been opted in for e-Delivery.

Consumers are able to access their mail from different web/e-mail/mobile clients digitally with security and content certification. The Digital Mailbox will help consumers manage their life better and should offer features beyond just mail management. The Digital Mail Platform provides an ecosystem which is secure, economical and competitive for high volume mailers, postal carriers and consumers. The illustrative systems described herein may facilitate large scale systems to accommodate mail traffic consistent with countrywide activity or even larger regional or global traffic. The U.S. population is over 300 million people. Additionally, the number of valid physical street addresses in the U.S. postal system is greater than 110 million addresses. It is possible that a Digital Mail Platform could handle mail segment volumes including Potential Transaction statements of 1 Billion pieces/year and Potential Direct Mail of 2 Billion pieces/year, or more. Each digitized document might average 200 Kbytes or more using one or more formats. Such as system may support 2 Million concurrent users and may support very fast response time for various user requests such 2 seconds for login and 1 second to view a mail piece.

Figure 2:
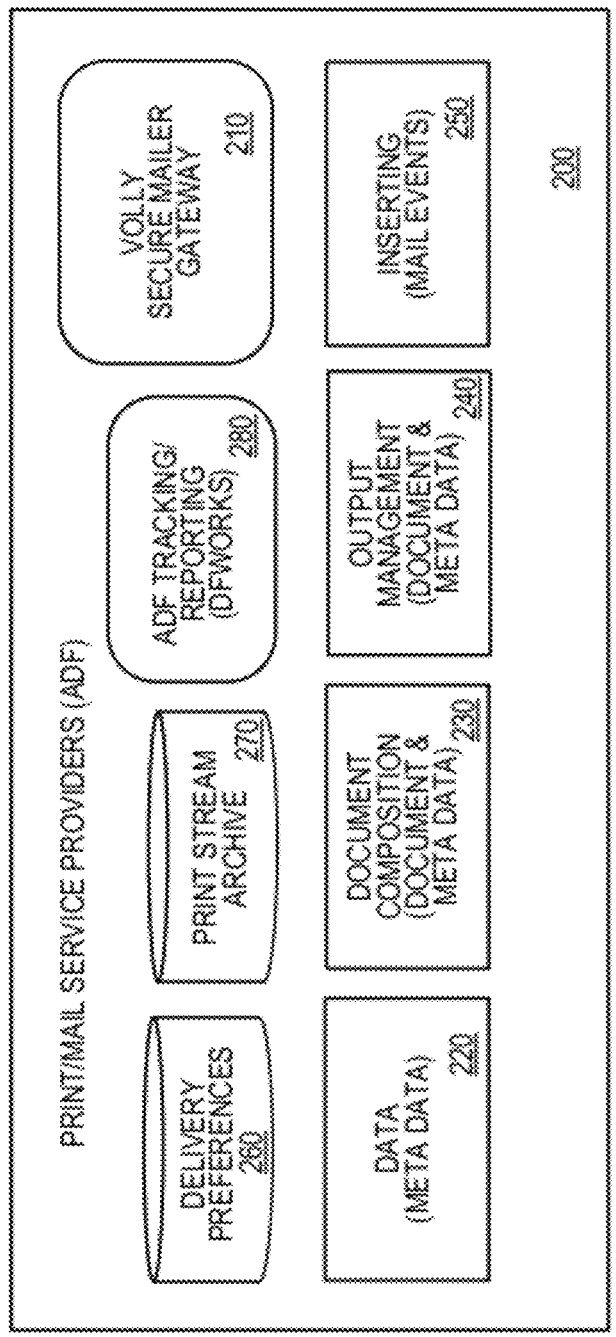
FIG. 2 is a schematic diagram showing an automated document factory for providing mail information according to an illustrative embodiment of the present application.

Referring to FIG. 2, a schematic diagram showing an automated document factory (ADF) 200 for providing mail information according to an illustrative embodiment of the present application is disclosed. Here, the ADF 200 may be implemented at a large company mail center, an outsourced mail center and/or an aggregate mail processing center. Recipient delivery preferences may be stored locally for company clients 260, may be integrated into the print stream or may be queried from an offsite data source during or shortly prior to print stream processing activities. Accordingly, when a financial institution processes a large batch of credit card statements to be sent to tens of thousands of recipients, they may be processed by such an ADF. A print stream archive may be maintained in memory storage 270.

The DFWORKS system 260 available from Pitney Bowes Inc. of Stamford, Conn. may be utilized for ADF tracking and reporting. Metadata is stored in memory storage 220, document composition to create/add/store/manipulate metadata occurs in server 230, output management for document and metadata output (including time-sensitive data such as calendar entries) are processed by server 240. A mail event inserter process runs on server 250 to provide for targeted promotional offer insertion, etc. Finally, the VOLLY secure mailer gateway system obtains electronic delivery data from the ADF for electronic mail pieces and physical mail pieces (meta data) for delivery into the VOLLY cloud architecture in the proper format.

Figure 3:
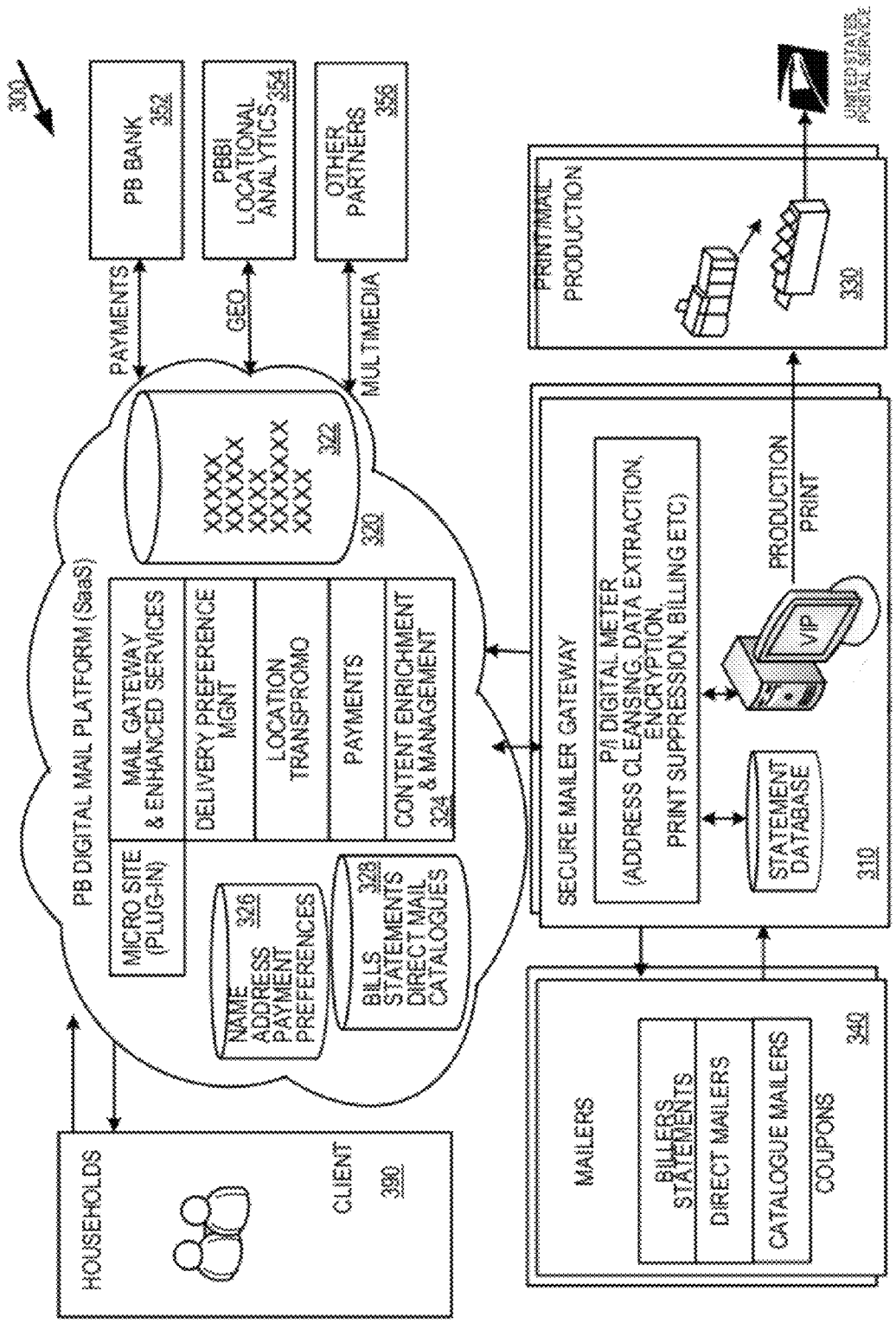
FIG. 3 is a schematic diagram showing a mail system according to an illustrative embodiment of the present application.

Referring to FIG. 3 is a schematic diagram showing a mail system 300 according to an illustrative embodiment of the present application. The system 300 provides the entire ecosystem for creation/delivery and processing of mail pieces delivered electronically and physically. Here, the household client, recipients and users of the system 390 typically use a PC based browser to access the DMP through the Internet or through some other suitable connection such as a wireless connection. The many diverse mailers 340 are represented and will process bills, statements, direct promotional mail, catalogues, coupons, etc. An automated document factory includes digital processing 310 and physical processing 330. The physical mail pieces in this illustrative embodiment are delivered by the United States Postal Service (USPS). The DMP 320 is connected to partners such as payment partners 352 for processing payments, location data partners 354 and other partners 356. Cloud processing services are hosted in cloud processing facility 324 and storage is shown at 322. Specific storage types include the individual user information with name, address and payment preferences, etc. 326 and document storage for bills, statements, direct mail and catalogues, etc. 328.

Figure 4A:
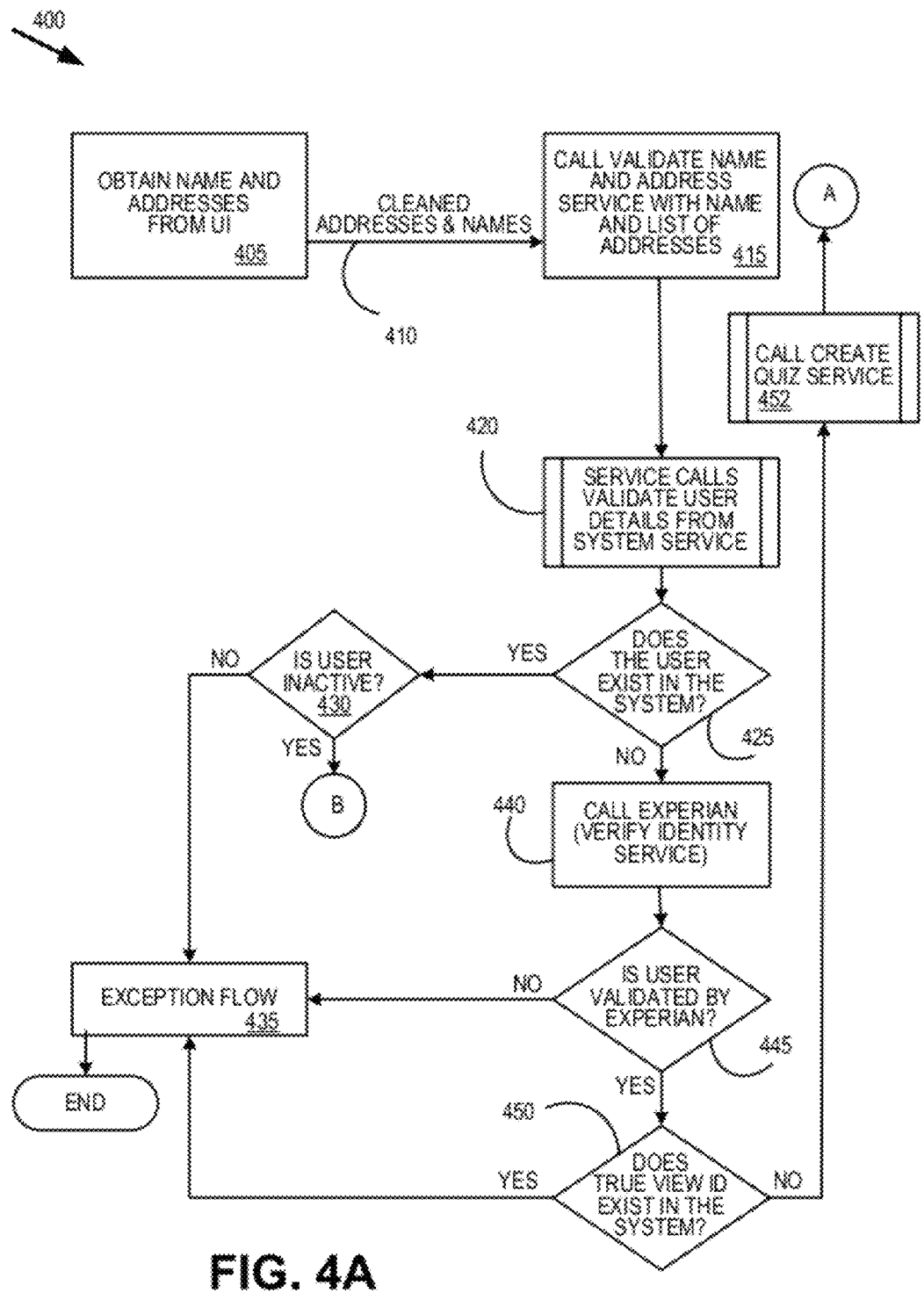
FIG. 4A-FIG. 4B is a flowchart diagram showing a process for efficient and timely user authentication using a sliding scale approach according to an illustrative embodiment of the present application.
Figure 4B:
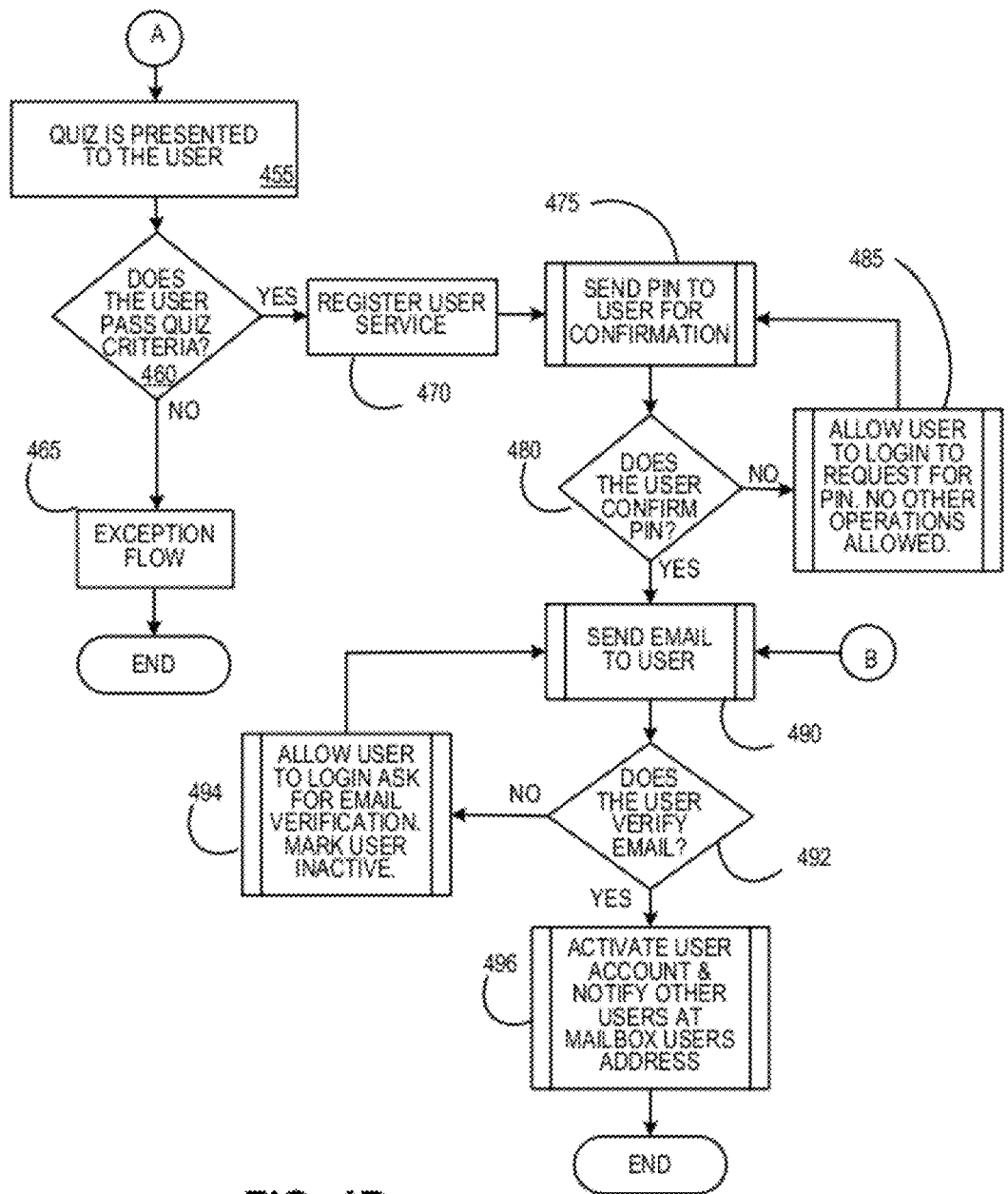

Referring to FIG. 4A-FIG. 4B, a flowchart diagram showing a computer implemented electronic process 400 for efficient and timely user authentication using a sliding scale approach according to an illustrative embodiment of the present application is shown.

In step 405, the system obtains the user name and one or more addresses using a program, browser or mobile App UI. In step 410, the addresses may be cleansed. In step 415, the system calls a validate name and address service and includes the name and list of addresses. In step 420, the Service calls a Validate user details system service. In step 425, if the user exists in the DMB system, then the system proceeds to step 430. In step 430, the DMB system determines if the user is active. If so, the system proceeds to step 490. If the user is not active, the system proceeds to an exception handling process at step 435 and ends.

If the user does not exist in the system at step 425, the system proceeds to step 440 to electronically call the identity verification service such as EXPERIAN TRUVUE. In step 445, the system determines if the user is validated by the EXPERIAN system. If not, the system proceeds to the exception handling process of step 435 and ends. If the user is validated, then the system proceeds to step 450 to determine if the EXPERIAN TRUEVUE ID exists in the system. If it does, then the system proceeds to the exception handling process of step 435 and ends. If not, then the system proceeds to step 452 to call the Quiz Service.

In step 455, the quiz is presented to the user. In step 460, the system determines if the user passes the quiz. If not, the system proceeds to the exception handling process of step 465 and ends. If so, the user is registered for the service in step 470. In step 475, the system sends a pin to the user for confirmation. For example, the user may receive the PIN through a second electronic communications channel such as through the SMS service to a cellular telephone. In step 480, the system determines if the user confirmed the PIN. If not, the system proceeds to step 485 to allow the user to login only to request a PIN and then proceeds back to step 475. If so, the system sends an email verification to the user in step 490. In step 492, the system determines if the user has verified the email. If not, the system proceeds to step 494 to allow the user to login only to request an email whereby the user is marked inactive. If so, the system activates the user account in step 496 and notifies any other users with accounts associated with that address. The process then ends.

In another illustrative embodiment, a computer system for processing user data relating to identity authentication over an electronic communications network for a user of a digital mailbox system includes a processor operatively connected to a memory, the memory comprising instructions to cause the processor to execute instructions including, obtaining a name and a current address from the user electronically using the communications network, determining if the current address is a valid address utilizing an address validation system, if the current address is determined to be invalid, then performing an error routine and halting the instructions, if the current address is determined to be valid, then determining if the name and current address are associated with an existing account on the digital mailbox system, then if the name and current address are associated with an existing account, then performing an existing account routine and halting the instructions, if the name and current address are not associated with an existing account, then electronically sending the name and current address to an identity verification system and electronically receiving identity verification data.

In an alternative illustrative embodiment, the system further includes the processor to execute instructions including obtaining additional identity data from the user electronically using the communications network, electronically sending the additional identity data to an identity verification system, determining an identity confidence value based upon the received identity verification data, and if the identity confidence value indicates no match, then performing an identity no match error routine and halting the instructions.

In yet another alternative embodiment, the further includes the processor to execute instructions including if the identity confidence value indicates a partial match or a full match, then electronically presenting an identity quiz having a passing score requiring a first score if the partial match is indicated and a second score that is lower than the first score, if the full match is indicated.

In yet another alternative embodiment, the system further includes the processor to execute instructions including if the passing score is indicated, sending a PIN to the user through a second electronic communications channel.

In yet another alternative system, the processor executes instructions including requesting the PIN from the user, and if the PIN is received from the user, then creating a digital mailbox account for the user.

In yet another alternative system, the processor executes instructions including determining if a second user has a digital mailbox associated with the current address, and if the second user has a digital mailbox associated with the current address, then notifying the second user that another digital mailbox has been created that is associated with the current address.

In yet another alternative system, the received identity verification data includes previous address data, and the quiz comprises at least a portion of the previous address data. In yet another alternative system, the second communications channel is a cellular telephone channel. In yet another alternative system, the existing account routine includes notifying the existing account that a new account request was received.

Figure 5:
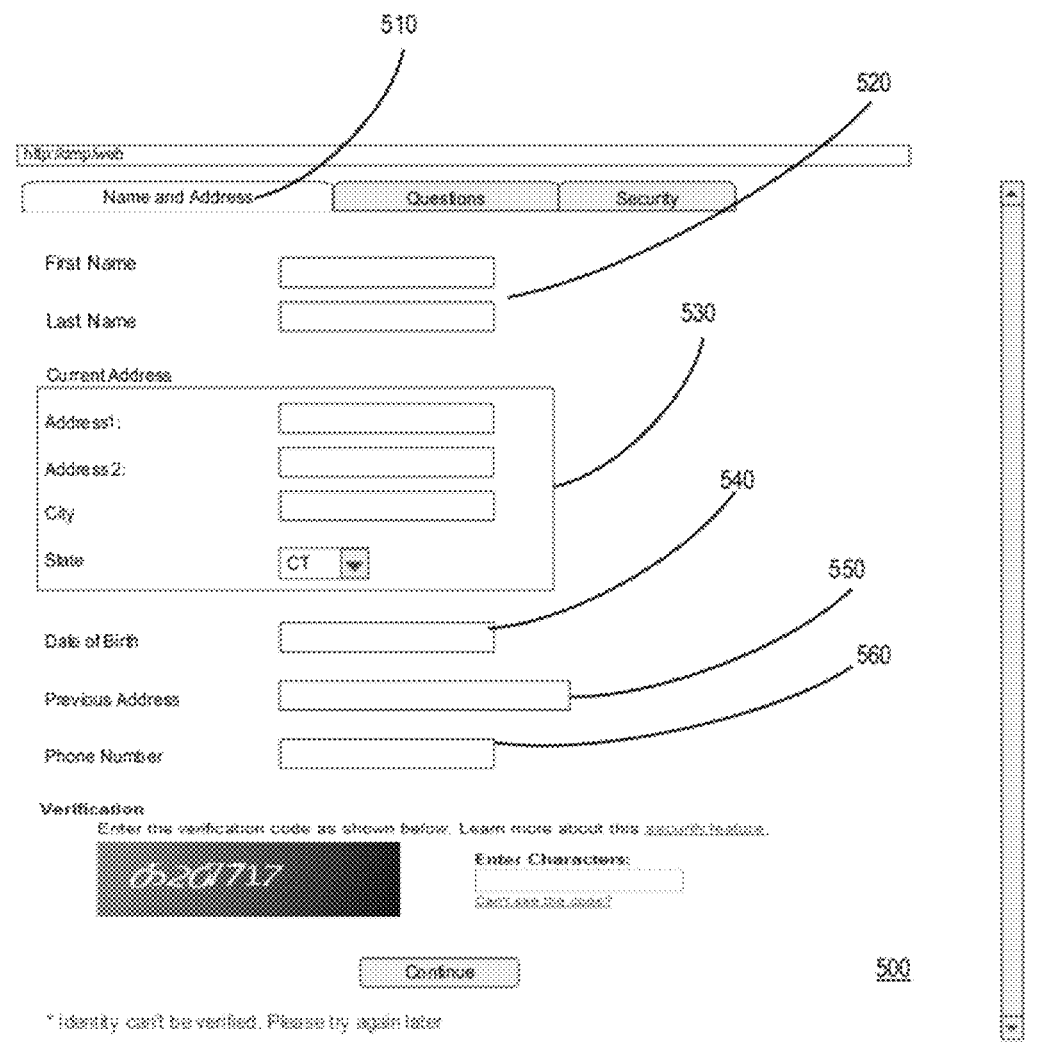

Referring to FIG. 5, a diagram showing a screen display 500 of a new user data entry screen according to an illustrative embodiment of the present application is shown. Here, the Registration Screen No. 1 asks for the basic customer details including name, current and previous address, Date of Birth (DOB) and Phone Number. Here, the Name and Address tab 510 brings the screen to the user. The name field 520 has text entry boxes for at least the First Name and Last Name. Additional name fields such as prefix, middle and suffix fields may be provided. The Current Address field 530 includes an Address field, city and State fields and may include ZIP and other address fields. The DOB field 540 may provide a pull down menu. The previous address field 550 may include free form or field entry mechanisms. Phone number field 560 is also provided.

Figure 6:
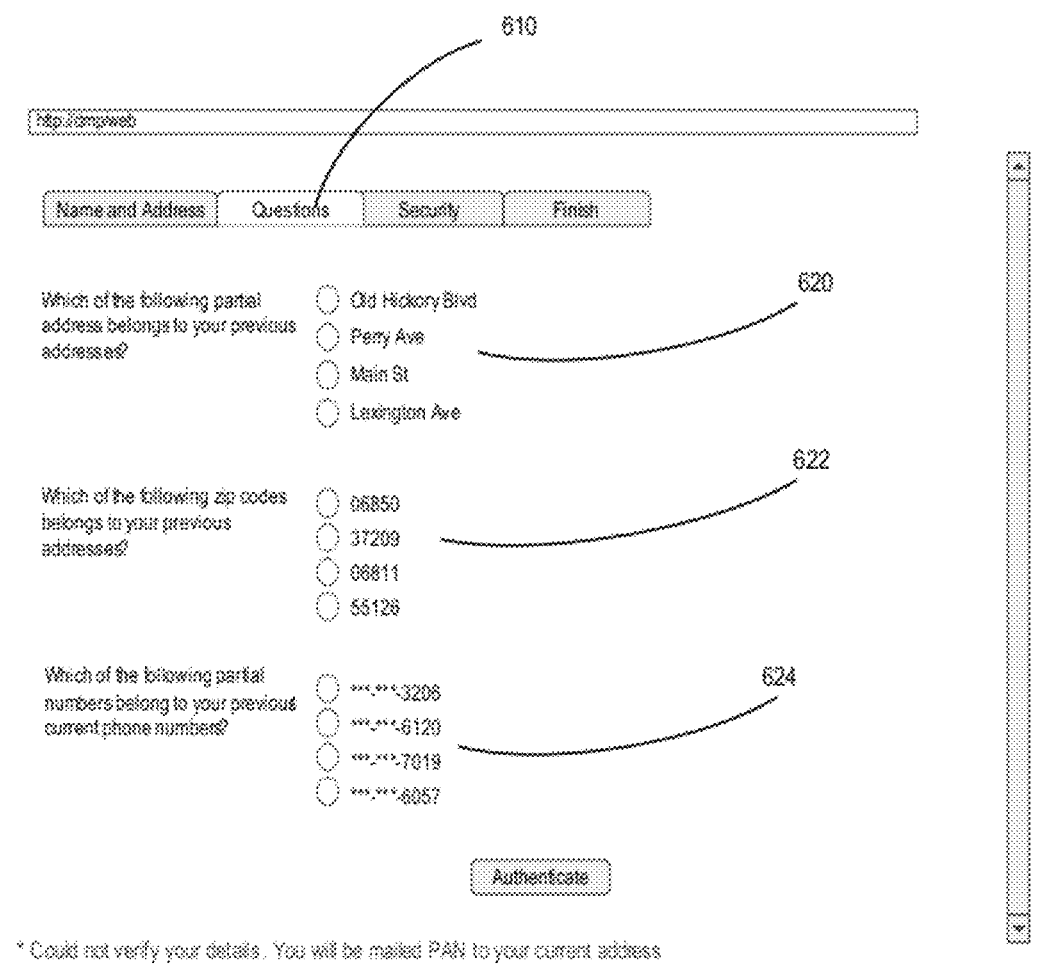

Referring to FIG. 6, a diagram showing a screen display 600 of a user authentication quiz according to an illustrative embodiment of the present application is shown. In Registration Screen No. 2, the screen is displayed after all the following conditions are met: (i) SPECTRUM call satisfies the address verification, (ii) there is no registered user with this information in the DMB database, (III) EXPERIAN call responds to the DMB request, and (iv) EXPERIAN response report has additional details on the consumer. Here, this screen requests more details on the consumer before authenticating or not authenticating.

In yet another illustrative embodiment, a computer program system being executed on a data processing and storage system for processing digitized items from a mailer associated with a digital mailbox that is configured to digitally process a new user subscription request to provide real-time subscription access includes the data processing system executing instructions including, electronically obtaining new user information, electronically attempting to authenticate the new user information using a first external provider, if the new user is authenticated using the first external provider, then allowing the new user to subscribe, if the new user is not authenticated using the first external provider, then using a second external provider and a user quiz to attempt to authenticate the new user information using the second external provider, if the new user is authenticated using the second external provider and quiz, then allowing the new user to subscribe, and if the new user is not authenticated using the second external provider, then providing an error message and instructions for further action to the user.

In yet another illustrative embodiment, systems and methods for efficient and fast authentication of new users of the VOLLY system are provided. The system allows a sliding scale approach to identity verification using multiple external identity data service providers and user queries as appropriate to provide real-time new user account setup in certain instances.

In one illustrative process, the first step is for the user to enter a name and address. So, to start the process, the user enters their name and physical mailing address into a browser User Interface (UI). The user can enter multiple addresses, such as up to three different addresses to accommodate users who own or rent multiple properties. In a second step, the system verifies the address. In this example, the SPECTRUM system available from Pitney Bowes of Stamford, Conn. is used as an external verification system in a Software as a Service (SaaS) model. Alternatively, the SPECTRUM verification is a separate activity and is not necessarily part of the identity verification module. Here, the system calls Spectrum (as an outside third party agency) or other address cleansing system to clean and verify each address. This verification process lookup continues until all of the addresses entered by the user have been verified. If they are not verified, the system can enter an error processing routine without having first expended the resources and incurred the cost of calling an user identity verification system.

The third step includes verification in the DMB system. Once the user's addresses have been cleansed by SPECTRUM, the system will then call a validateUserNameAndAddress routine or service. This service will check to determine s if the user already exists in the DMB system. If the user is found to exist, then the system will stop executing the authentication routine and will switch to an existing user—Active/Inactive process. If the user does not exist in the DMB system, then the system calls a user identity verification service such as EXPERIAN to validate the details provided by the user. The system then again checks to see if a user with that identity information such as a TRUE-VIEW-ID exists in the DMB system. If so, the system would stop the user authentication process and proceed to another User does already exist process based upon the user identity verification. If a partial/full match is received from EXPERIAN then verify if TRUE-VIEW-ID exists in the system.

In one alternative, if the TRUE-VIEW-ID exists in DMB, the user is validated. If the TRUE-VIEW-ID is not in the DMB system, then the user must answer the quiz questions.

In another alternative, if the TRUE-VIEW-ID exists, then in one alternative, the user is validated without a quiz based on the previous TRUE-VIEW-ID. If the TRU-VIEW-ID does not exist, then the system calls another ID service to build a quiz for the user and presents the quiz to the user.

In yet another alternative, EXPERIAN will send a TRUE-VIEW-ID for partial and full match cases and the system will validate based on this information. If the user is not validated from EXPERIAN then we will invoke fraud management scheme internally to our system and store the details.

Here, if the user is validated by EXPERIAN (Full Match/Partial Match) then the user will be presented with a quiz. The user must answer two out of three questions (if it was a full match from EXPERIAN) or three out of three questions (if it was a partial match from EXPERIAN). Here, the quiz is based upon prior address data received from EXPERIAN and is in multiple choice format including one correct and multiple incorrect entries for each of the questions relating to prior addresses. If the user does not pass the quiz such as by not answering a sufficient number of questions correctly (either three out of three or two out of three), then an error routine will commence. For example, a message will appear telling them that a physical mail piece will be sent to them with a pin and instructions.

If the user answers the questions correctly, then the system will prompt them for additional registration information, phone number etc. A pin will be sent to them though SMS to their mobile telephone and DMB will notify other users at the same address that an account from this address has been created. Such notification may minimize fraud. At this point the user is considered "inactive." The user will need to login with the pin number to activate their account (sent through SMS) and also need to validate their eMail Id to start adding mail senders.

If the system proceeds to the existing user—Active/Inactive process, then if the user exists and is inactive, the system will flag this as a dispute situation and send an email message to the user, that their mail box is inactive. In an alternative, the system sends a PIN verification notice. If the user exists and is active, then the system triggers a dispute situation (which means someone has already registered to the system and is using the account). Here, the user will get a message asking them to call a service representative. The system will also alert an operator to the situation.

In one alternative, if the user does not already exist in the system then EXPERIAN will be called with user's name and addresses. EXPERIAN will validate the information provided. If the user is not validated, then the user will be asked to reenter the information, if the information still does not pass validation then the user will be asked to call a service representative.

In another illustrative embodiment, the consumer enters the following mandatory fields in a signup screen: 1. Name, 2. Current address, 3. at least two of the following, a. Previous address, b. Date of birth, and c. Phone Number.

An existing SPECTRUM system is integrated and used for current address validation. Once the address is validated, the DMB—EXPERIAN Integration system will make a call to the EXPERIAN TRUEVUE system. This process of performing address validation with SPECTRUM before the call to EXPERIAN will reduce the number of unnecessary calls to the EXPERIAN system. The response from the EXPERIAN system will have the TRUVUE ID attached to it in the case of a hit. In case of an error, the response will have the error code returned.

The response will have verification codes for Name, DOB, Phone Number, Current Address which indicates if the request is an exact match or similar match or doesn't match.

When a user moves from an address, he will try to update to the new address in the DMB system. Before updating the user/consumer entered address in the database, the DMB system will make another call to EXPERIAN to see if the new address belongs to that consumer. If EXPERIAN returns a no hit, the DMB system will send an error to the consumer indicating that the system cannot verify the new address. A PIN will then be sent to his current address to proceed. If EXPERIAN verifies the new address, then the DMB system will update the new address in the database.

In the described embodiments, illustrative user client devices 390 may include a desktop personal computer, a laptop personal computer, a tablet personal computer, smartphone and/or PDA or the like. They may be connected to the Internet using a wired connection, a wireless LAN connection and/or wireless WAN/cellular or other suitable alternative. Each of the user client devices is a DELL desktop, laptop or tablet respectively and executes a WINDOWS 7 operating system and an INTERNET EXPLORER browser or a MOTOROLA device such as a DROID 3 or XYBOARD executing the ANDROID operating system or APPLE IPAD or IPHONE executing the iOS operating system. Each client device includes at least one processor, display, input such as a keyboard and mouse, RAM memory for data and instructions, disk memory, network and external storage connections.

If the above mentioned cloud architectures are not used, the server may include a DELL POWEREDGE M1000E server, but other servers may be used including geographically dispersed and/or load balanced servers. Such servers include at least one processor, RAM memory for data and instructions, disk memory, network and external storage connections. Alternatively, an IBM POWER 795 Server or APACHE Web Server may be utilized. Here, the Internet is utilized for many of the network connections of the systems 100/300, but other networks including LAN, WAN, cellular, satellite and other wired and/or wired networks may be used for one or more of the interconnections shown. The databases storing user login information and user account information may be configured using an available relational database such as ORACLE 12i or MICROSOFT SQL server or APACHE CASSANDRA. Any or all of the databases may be resident in a single server or may be geographically distributed and/or load balanced. They may be retrieved in real time or near real time using networking such as web services connected to third party data providers. Many alternative configurations may be used including multiple servers and databases including a geographically distributed system. The processes described herein may be implemented in C++, Java, C# on a MICROSOFT WINDOWS 7 platform and utilize the ADOBE CQ5 web content management system. Alternatively, PHP code may be used with open source systems and APACHE web server with APACHE CASSNDRA databases. Other alternatives such as the JOOMLA content management system and MYSQL databases may be utilized.

Typical mailers include organizations that create and deliver transactional and periodic physical communications that are often sent by first class mail such organizations including utilities, financial institutions, marketers and government agencies. Such mailers have IT systems that include recipient databases and IT systems used to provide print streams such as legacy mainframe systems that provide print stream data for statements, etc. that may be printed in the native format or reformatted and enhanced before printing. Alternatively, a Mailer may own and operate system.

In certain illustrative embodiments, the system receives a single print stream from a mailer and uses recipient profile data received from the mailer or otherwise obtained from the user to split the print stream into physical and electronic delivery streams. The Physical Distribution subsystem (printing/mailing of hard copy) is implemented in the illustrative embodiment as an automated document factory (ADF) using mail piece creation systems described may be obtained from Pitney Bowes Inc. of Stamford, Conn. that include the PITNEY BOWES SERIES 11 inserter systems, the PITNEY BOWES INTELLIJET printing system, and the PITNEY BOWES DM INFINITY postage meter. The documents produced may include the full range of documents processed in ADFs including direct mail, statements such as monthly or financial transaction statements of accounts, credit cards and brokerage accounts and may also include bills for services and utilities and goods purchased. The physical mail is then delivered to a physical mailbox for the household 70 and accessed by a member of the household.

In alternatives, the Digital Distribution subsystem may be implemented as a combination of email push systems and World Wide Web hosted electronic messaging pull systems. E-messaging system available from the Pitney Bowes Business Insights group may be built into the server.

Additionally, certain redundant communications processing systems have been described. Commonly-owned, co-pending U.S. patent application Ser. No. 12/650,751, entitled System and Method for Providing Redundant Customer Communications Delivery Using Hybrid Delivery Channels, filed by Sagi, et al. on Dec. 31, 2009 describes such systems and is incorporated by reference herein in its entirety. Such systems described therein may be modified using the systems, processes and techniques described herein.

Furthermore, certain print stream processing systems have been described for serving multiple mail recipients in a household. Commonly-owned, co-pending U.S. patent application Ser. No. 12/651,324, entitled System and Method for Electronic Delivery of Mail, filed by Sagi, et al. on Dec. 31, 2009 describes such systems and is incorporated by reference herein in its entirety. Such systems described therein may be modified using the systems, processes and techniques described herein.

Any of the alternatives described herein may be combined and/or interchanged with embodiments and alternatives including individual components thereof as appropriate.

Although the invention has been described with respect to particular illustrative embodiments thereof, it will be understood by those skilled in the art that the foregoing and various other changes, omissions and deviations in the form and detail thereof may be made without departing from the scope of this invention.

What is claimed is:

1. A computer system for processing user data relating to identity authentication over an electronic communications network for a user of a digital mailbox system comprising:
   a processor operatively connected to a memory, the memory comprising instructions to cause the processor to execute instructions including,
   obtaining a name and a current address from the user electronically using the communications network;
   determining if the current address is a valid address utilizing an address validation system;
   if the current address is determined to be invalid, then performing an error routine and halting the instructions,
   if the current address is determined to be valid, then determining if the name and current address are associated with an existing account on the digital mailbox system, then
   if the name and current address are associated with an existing account, then performing an existing account routine and halting the instructions,
   if the name and current address are not associated with an existing account, then electronically sending the name and current address to an identity verification system and electronically receiving identity verification data.

2. The system of claim 1, further comprising:
   the processor to execute instructions including:
   obtaining additional identity data from the user electronically using the communications network;
   electronically sending the additional identity data to an identity verification system;
   determining an identity confidence value based upon the received identity verification data; and
   if the identity confidence value indicates no match, then performing an identity no match error routine and halting the instructions.

3. The system of claim 2, further comprising:
   the processor to execute instructions including:
   if the identity confidence value indicates a partial match or a full match, then electronically presenting an identity quiz having a passing score requiring a first score if the partial match is indicated and a second score that is lower than the first score, if the full match is indicated.

4. The system of claim 3, wherein,
   the received identity verification data includes previous address data, and the quiz comprises at least a portion of the previous address data.

5. The system Of claim 3, further comprising:
   the processor to execute instructions;
   if the passing score is indicated, sending a PIN to the user through a second electronic communications channel.

6. The system of claim 5, wherein,
   the second communications channel is a cellular telephone channel.

7. The system of claim 5, further comprising:
   the processor to execute instructions including:
   requesting the PIN from the user, and if the PIN is received from the user, then creating a digital mailbox account for the user.

8. The system of claim 7, further comprising:
   the processor to execute instructions including:
   determining if a second user has a digital mailbox associated with the current address, and if the second user has a digital mailbox associated with the current address, then notifying the second user that another digital mailbox has been created that is associated with the current address.

9. The system of claim 1, wherein,
   the existing account routine includes notifying the existing account that a new account request was received.

10. A computer implemented method for processing user data relating to identity authentication over an electronic communications network for a user of a digital mailbox system comprising:
    obtaining a name and a current address from the user electronically using the communications network;
    determining if the current address is a valid address utilizing an address validation system;
    if the current address is determined to he invalid, then performing an error routine and halting the instructions,
    if the current address is determined to be valid, then determining if the name and current address are associated with an existing account on the digital mailbox system, then
    if the name and current address are associated with an existing account, then performing an existing account routine and halting the instructions,
    if the name and current address are not associated with an existing account, then electronically sending the name and current address to an identity verification system and electronically receiving identity verification data.

11. The method of claim 10, further comprising:
    obtaining additional identity data from the user electronically using the communications network;
    electronically sending the additional identity data to an identity verification system;
    determining an identity confidence value based upon the received identity verification data; and
    if the identity confidence value indicates no match, then performing an identity no match error routine and hafting the instructions.

12. The method of claim 11, further comprising:
    if the identity confidence value indicates a partial match or a full match, then electronically presenting an identity quiz having a passing score requiring a first score if the partial match is indicated and a second score that is lower than the first score, if the full match is indicated.

13. The method of claim 12, wherein,
    the received identity verification data includes previous address data, and the quiz comprises at least a portion of the previous address data.

14. The method of claim 12, further comprising:
    if the passing score is indicated, sending a PIN to the user through a second electronic communications channel.

15. The method of claim 14, wherein,
    the second communications channel is a cellular telephone channel.

16. The method of claim 14, further comprising:
    requesting the PIN from the user, and if the PIN is received from the user, then creating a digital mailbox account for the user.

17. The method of claim 16, further comprising:
    determining if a second user has a digital mailbox associated with the current address, and if the second user has a digital mailbox associated with the current address, then notifying the second user that another digital mailbox has been created that is associated with the current address.

18. The method of claim 10, wherein,
    the existing account routine includes notifying the existing account that a new account request was received.

* * * * *